(12) United States Patent
Watanabe et al.

(10) Patent No.: US 12,460,380 B2
(45) Date of Patent: Nov. 4, 2025

(54) ELECTRIC WORK MACHINE

(71) Applicant: HITACHI CONSTRUCTION MACHINERY CO., LTD., Tokyo (JP)

(72) Inventors: Akira Watanabe, Ushiku (JP); Ken Takeuchi, Kasumigaura (JP); Yuki Makimura, Tsuchiura (JP); Kenta Tanigaki, Abiko (JP); Seiji Ishida, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/843,864

(22) PCT Filed: Mar. 16, 2023

(86) PCT No.: PCT/JP2023/010447
§ 371 (c)(1),
(2) Date: Sep. 4, 2024

(87) PCT Pub. No.: WO2023/182182
PCT Pub. Date: Sep. 28, 2023

(65) Prior Publication Data
US 2025/0179772 A1    Jun. 5, 2025

(30) Foreign Application Priority Data
Mar. 22, 2022    (JP) ................. 2022-044918

(51) Int. Cl.
*E02F 9/20*    (2006.01)
*B60L 9/00*    (2019.01)
(Continued)

(52) U.S. Cl.
CPC ............. *E02F 9/207* (2013.01); *B60L 9/00* (2013.01); *B60L 15/007* (2013.01); *B60L 15/20* (2013.01);
(Continued)

(58) Field of Classification Search
CPC ........ B60L 3/0046; B60L 50/12; B60L 50/13; B60L 15/007; B60L 50/61; B60L 50/60;
(Continued)

(56) References Cited

U.S. PATENT DOCUMENTS 3,566,717 A * 3/1971 Baruch ................. B60L 3/06
903/910
4,655,689 A * 4/1987 Westveer ................ F04B 1/324
60/449

(Continued)

FOREIGN PATENT DOCUMENTS

JP        4979529 B2 *  7/2012
JP     2013-062890 A    4/2013

(Continued)

OTHER PUBLICATIONS

JP5658785 English Translation and Original Document (Year: 2014).*
(Continued)

*Primary Examiner* — Paul N Dickson
*Assistant Examiner* — Caitlin Anne Miller
(74) *Attorney, Agent, or Firm* — MATTINGLY & MALUR, PC (57) ABSTRACT

A control device of an electric hydraulic excavator sets or computes a rotation speed command and an allowable torque of an electric motor on the basis of a required rotation speed of the electric motor, and a sum of a suppliable electric power of a converter and a battery suppliable electric power. An inverter of the electric hydraulic excavator sets the allowable torque to a torque command if a calculated torque of the electric motor computed by multiplying by a gain, a difference between the rotation speed command and a rotation speed of the electric motor, exceeds the allowable torque, and sets the calculated torque to the torque command if the calculated torque does not exceed the allowable
(Continued)

torque. The inverter supplies the electric power that can generate a torque corresponding to the torque command to the electric motor.

3 Claims, 8 Drawing Sheets

(51) Int. Cl.
 *B60L 15/00* (2006.01)
 *B60L 15/20* (2006.01)
 *B60L 50/60* (2019.01)
 *B60L 50/70* (2019.01)
 *E02F 9/22* (2006.01)

(52) U.S. Cl.
 CPC .............. *B60L 50/60* (2019.02); *B60L 50/70* (2019.02); *E02F 9/2296* (2013.01); *B60L 2200/40* (2013.01); *E02F 9/2203* (2013.01); *E02F 9/2285* (2013.01); *E02F 9/2292* (2013.01)

(58) Field of Classification Search
 CPC ...... B60L 2200/40; B60L 50/70; E02F 9/207; E02F 9/2296; E02F 9/2292; E02F 9/2285; E02F 9/2203
 USPC ........................................................ 180/53.4
 See application file for complete search history.

(56) References Cited

U.S. PATENT DOCUMENTS

| | | | | |
|---|---|---|---|---|
| 5,334,923 | A * | 8/1994 | Lorenz .................... | H02P 21/18 318/807 |
| 6,161,640 | A * | 12/2000 | Yamaguchi ........... | B60W 10/06 180/197 |
| 7,673,713 | B2 * | 3/2010 | Betz ........................ | B60L 58/30 180/65.245 |
| 10,348,222 | B2 * | 7/2019 | Dutta ...................... | B60L 50/13 |
| 10,947,702 | B2 * | 3/2021 | Takahashi ............. | E02F 9/2296 |
| 11,177,760 | B2 * | 11/2021 | Coroban-Schramel ...................... H02P 29/027 | |
| 12,231,036 | B2 * | 2/2025 | Watanabe ............. | E02F 9/2091 |
| 2020/0224389 | A1 | 7/2020 | Takahashi et al. | |

FOREIGN PATENT DOCUMENTS

| | | |
|---|---|---|
| JP | 2014-204633 A | 10/2014 |
| WO | 2020/049668 A1 | 3/2020 |

OTHER PUBLICATIONS

JP5691955 English Translation and Original Document (Year: 2013).*
International Search Report of PCT/JP2023/010447 dated May 16, 2023.

* cited by examiner

);
ELECTRIC WORK MACHINE

TECHNICAL FIELD

The present invention relates to an electric work machine.

BACKGROUND ART

Conventionally, a hydraulic drive system for an electric work machine is known. The hydraulic drive system for the electric work machine described in Patent Literature 1 includes an electric motor, a hydraulic pump, a plurality of actuators, a control valve device, and a controller (paragraph 0019, claim 1, etc.).

The hydraulic pump is driven by the electric motor. The plurality of actuators is driven by a hydraulic fluid delivered from the hydraulic pump. The control valve device distributes and feeds the hydraulic fluid delivered from the hydraulic pump to the plurality of actuators. The controller controls a rotation speed of the electric motor thereby to control a delivery flow rate of the hydraulic pump.

In this conventional hydraulic drive system, the controller computes a hydraulic power consumed by the hydraulic pump, and computes a maximum angular acceleration allowed for the electric motor on the basis of a magnitude of the hydraulic power and a preset maximum allowable power consumable by the electric motor. Further, the controller limits an angular acceleration of the electric motor so as not to exceed the maximum angular acceleration and controls the rotation speed of the electric motor.

According to this conventional hydraulic drive system, even in a case where the consumed power of the hydraulic pump driven by the electric motor fluctuates due to variation in load pressure applied to the hydraulic pump or the like, the angular acceleration of the electric motor is correspondingly limited, and thus the power consumed by the electric motor is reliably limited within a preset range of the maximum allowable power (Patent Literature 1, paragraph 0022). Additionally, in a case where the consumed power of the hydraulic pump is low and the power can be distributed to increase the rotation speed of the electric motor, the angular acceleration of the electric motor can be set to a larger value, and thus the rotation speed of the electric motor increases quickly and the plurality of actuators can be driven with excellent responsiveness (the same literature, paragraph 0023).

CITATION LIST

Patent Literature

Patent Literature 1: WO 2020/049668 A

SUMMARY OF INVENTION

Technical Problem

The above-described conventional hydraulic drive system for the electric work machine includes an inverter for controlling the rotation speed of the electric motor, a battery that supplies DC power to the inverter, and an AC/DC converter connected to the inverter. The AC/DC converter converts, into DC power, AC power supplied from a commercial power source, and supplies the DC power to the inverter (Patent Literature 1, paragraph 0035). This commercial power source is prepared by a user of the electric work machine, and may have a limited power supply performance due to limitations such as a contracted power amount of the user, a capacity of a power conversion facility, or the like, and thus the user may change the electric power supplied by the commercial power source.

Consequently, the torque generated by the electric motor with the electric power supplied from the commercial power source may not be able to cover the maximum load of the hydraulic pump. In this case, electric power may be supplied from the battery to the electric motor. However, if any anomaly causes a decrease in the electric power that can be supplied from the battery to the electric motor, electric power sufficient to generate a torque required to drive the hydraulic pump may no longer be supplied from the battery to the electric motor, and the electric motor may stall.

The present invention provides an electric construction machine that can avoid stalling of the electric motor that drives the hydraulic pump and avoid unintentional stopping of the actuator that operates by hydraulic pressure generated by the hydraulic pump, even if the suppliable electric power of each of the power sources changes and the maximum supply power from the plurality of power sources changes.

Solution to Problem

In one aspect of the present disclosure, the electric construction machine comprises: an inverter connected to a plurality of power sources, each having a suppliable electric power that changes; an electric motor driven by an electric power supplied from the plurality of power sources via the inverter; a hydraulic pump driven by the electric motor; an actuator that operates by hydraulic pressure generated by the hydraulic pump; and a control device that controls the electric power supplied to the electric motor via the inverter. The control device sets or computes a rotation speed command and an allowable torque of the electric motor on the basis of a required rotation speed of the electric motor or a drive torque of the hydraulic pump and a maximum supply power of the plurality of power sources. The inverter sets the allowable torque to a torque command if a calculated torque of the electric motor computed by multiplying by a gain, a difference between the rotation speed command and a rotation speed of the electric motor, exceeds the allowable torque, and sets the calculated torque to the torque command if the calculated torque does not exceed the allowable torque, and the inverter supplies an electric power that can generate a torque corresponding to the torque command to the electric motor.

Advantageous Effects of Invention

According to the above aspect of the present disclosure, it is possible to provide an electric hydraulic excavator that can avoid stalling of the electric motor that drives the hydraulic pump and avoid unintentional stopping of the actuator that operates by hydraulic pressure generated by the hydraulic pump, even if the suppliable electric power of each of the power sources changes and the maximum supply power from the plurality of power sources changes.

DESCRIPTION OF EMBODIMENTS

Hereinafter, embodiments of the electric work machine according to the present disclosure will be described with reference to the drawings.

First Embodiment

Figure 1:
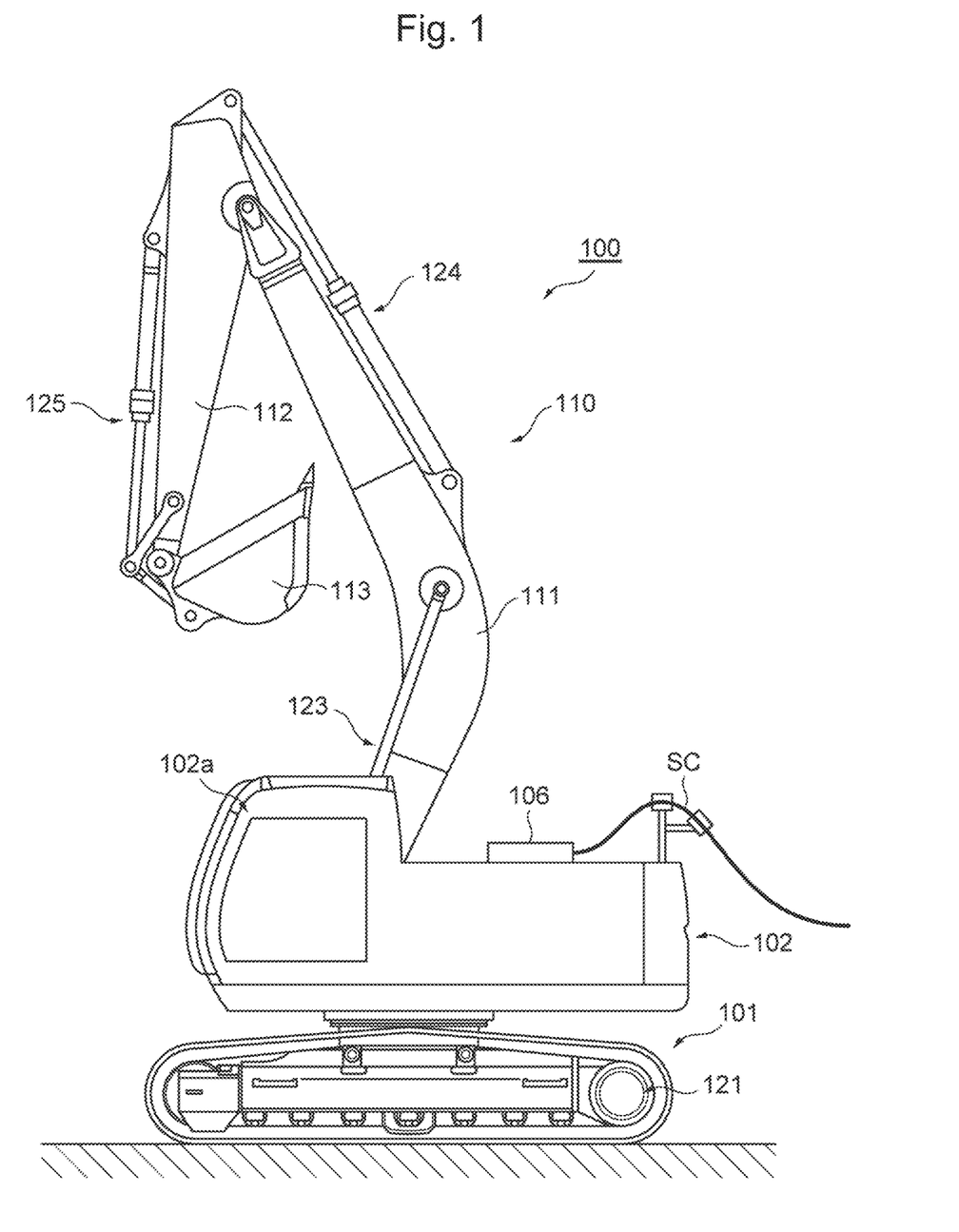
FIG. 1 is a side view illustrating a first embodiment of an electric work machine according to the present invention.
Figure 2:
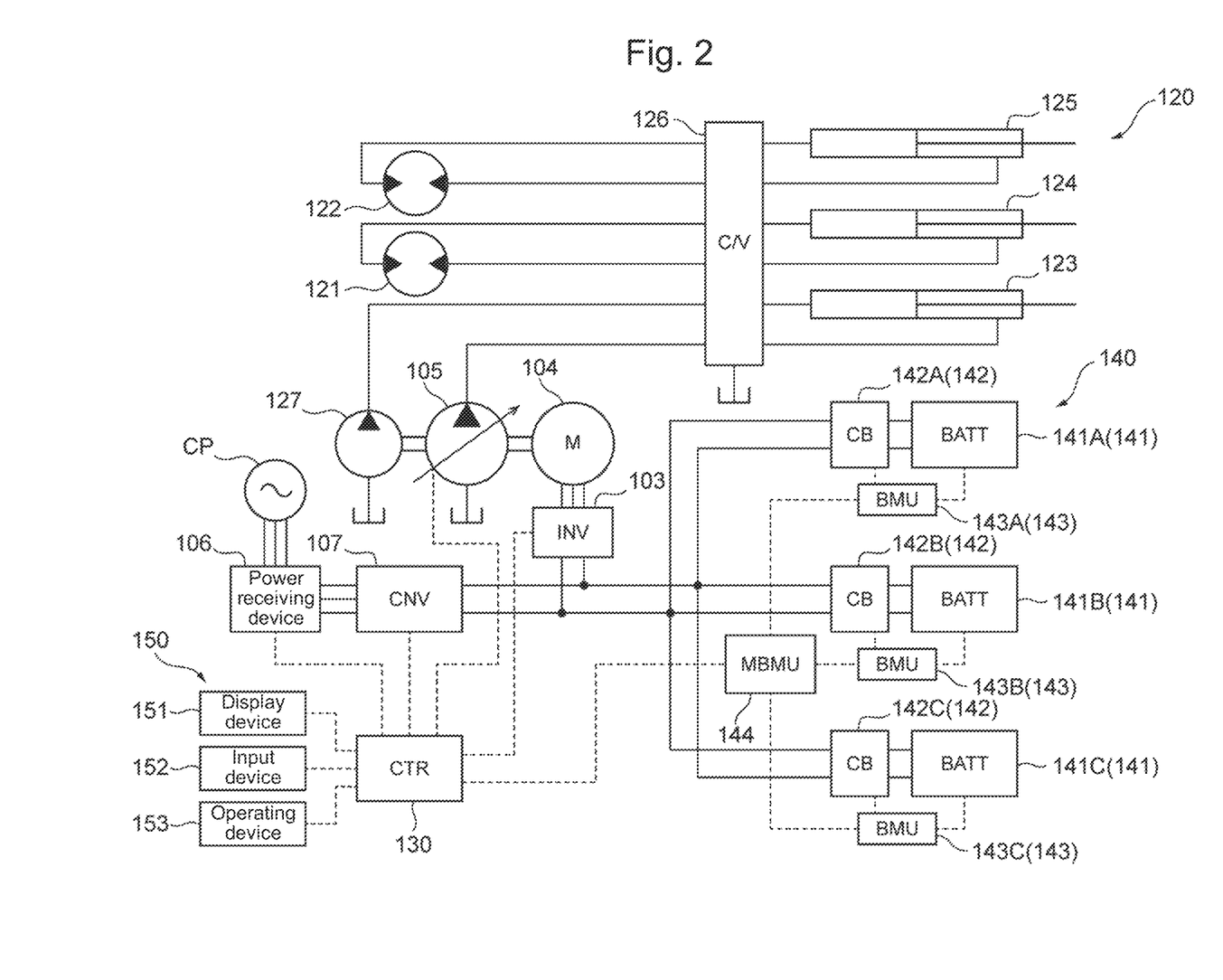
FIG. 2 is a block diagram illustrating a schematic configuration of the electric work machine of FIG. 1.
Figure 3:
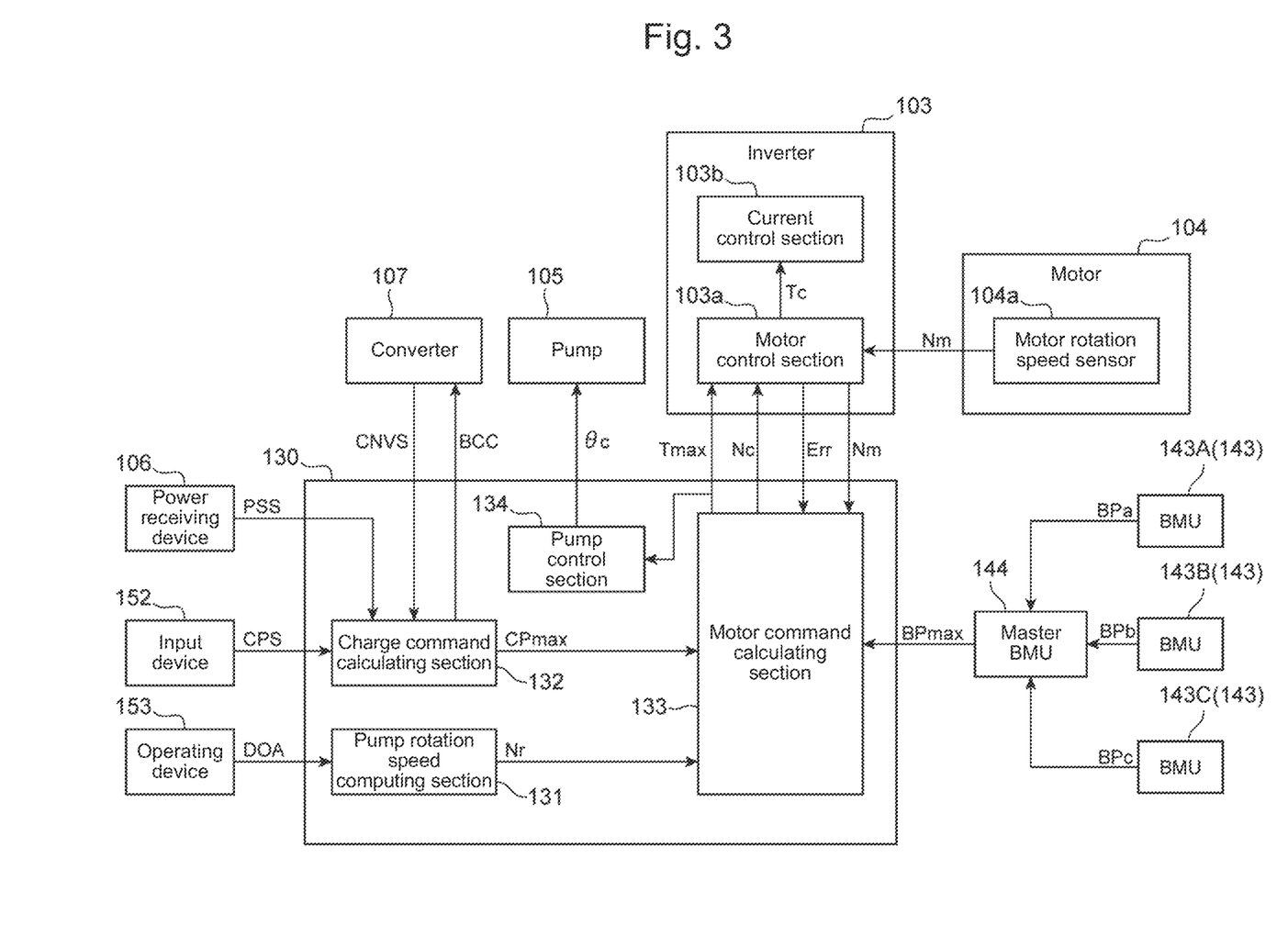
FIG. 3 is a block diagram illustrating an input/output relationship of signals between the components of the electric work machine of FIG. 2.

FIG. 1 is a side view illustrating the first embodiment of an electric hydraulic excavator as the electric work machine according to the present disclosure. FIG. 2 is a block diagram illustrating a schematic configuration of the electric hydraulic excavator of FIG. 1. FIG. 3 is a block diagram illustrating an input/output relationship of signals between the components of the electric hydraulic excavator of FIG. 2.

An electric hydraulic excavator 100 of the present embodiment includes, for example, a traveling body 101, a turning body 102, and a work implement 110. In addition, the electric hydraulic excavator 100 includes, for example, an inverter 103, an electric motor 104, a hydraulic pump 105, an actuator 120, and a control device 130. In addition, the electric hydraulic excavator 100 includes, for example, a power receiving device 106, a converter 107, and a power storage device 140. Further, the electric hydraulic excavator 100 includes, for example, a human machine interface (HMI) 150.

The traveling body 101 includes left and right crawlers, for example. The traveling body 101, for example, rotates the left and right crawlers by means of left and right hydraulic motors 121 (described later) to cause the electric hydraulic excavator 100 to travel in a desired direction. The turning body 102 is mounted on the traveling body 101 so as to be able to turn relative to the traveling body 101 by means of a hydraulic motor 122 (described later).

The work implement 110 includes a boom 111, an arm 112, and a bucket 113, for example. The boom 111 is mounted on the front part of the turning body 102 at the center portion in the width direction so as to be able to rotate vertically relative to the turning body 102 by extending or retracting a boom cylinder 123 (described later), for example. The arm 112 is mounted at the tip portion of the arm 112 so as to be able to rotate vertically relative to the boom 111 by extending or retracting an arm cylinder 124 (described later), for example. The bucket 113 is mounted at the tip portion of the arm 112 so as to be able to rotate vertically relative to the arm 112 by extending or retracting a bucket cylinder 125 (described later), for example.

The actuator 120 includes, for example, the left and right traveling hydraulic motors 121 that rotate the left and right crawlers of the traveling body 101, the turning hydraulic motor 122 that causes the turning body 102 to turn, the boom cylinder 123, the arm cylinder 124, and the bucket cylinder 125 that cause the work implement 110 to operate.

A control valve 126, for example, distributes a hydraulic fluid pressure-fed from the hydraulic pump 105 to the traveling hydraulic motor 121, the turning hydraulic motor 122, the boom cylinder 123, the arm cylinder 124, and the bucket cylinder 125. The hydraulic pump 105 and a pilot pump 127 are driven by the electric motor 104 as an electric motor (described later), for example. The pilot pump 127 supplies pilot pressure that is hydraulic pressure to the control valve 126 of a pilot hydraulic operation system, so as to drive the control valve 126.

The inverter 103 is connected to the plurality of power sources, each having a suppliable electric power that changes. More specifically, in the example of FIG. 2, the inverter 103 is connected, via the converter 107, to a commercial power source CP that is a first power source, and is also connected to the power storage device 140 that is a second power source. There are various types of commercial power source CP prepared by the user of the electric hydraulic excavator 100 and their suppliable electric powers vary depending on the specification. In addition, the power storage device 140 has a suppliable electric power that changes when a malfunction occurs in any of a plurality of battery packs 141A, 141B, 141C of the power storage device 140, for example.

The inverter 103 includes an inverter circuit, and converts DC power supplied from the power storage device 140 into three-phase AC power and supplies the AC power to the electric motor 104, for example. As illustrated in FIG. 3, for example, the inverter 103 includes a motor control section 103a and a current control section 103b. The inverter 103 includes one or more microcontrollers, for example. The functions of the motor control section 103a and the current control section 103b are implemented by the microcontroller(s) through execution of programs stored in a memory by means of a central processing unit (CPU).

The motor control section 103a, for example, acquires a rotation speed Nm of the electric motor 104 from a motor rotation speed sensor 104a provided on the electric motor 104 and outputs the rotation speed Nm to the control device 130. In addition, the motor control section 103a, for example, monitors states of the inverter 103 and the electric motor 104 to detect an anomaly, and outputs a signal Err related to an abnormal state of the inverter 103 and the electric motor 104 to the control device 130.

In addition, the motor control section 103a, for example, outputs a torque command Tc for the electric motor 104 to the current control section 103b on the basis of a rotation speed command Nc for the electric motor 104 and an allowable torque Tmax of the electric motor 104 received from the control device 130. The current control section 103b, for example, controls an insulated gate bipolar transistor (IGBT) of the inverter circuit such that the electric motor 104 outputs torque corresponding to the torque command Tc for the electric motor 104 received from the motor control section 103a, and controls the rotation speed of the electric motor 104.

The electric motor 104, for example, rotates by three-phase AC current supplied from the inverter 103, and drives the hydraulic pump 105 and the pilot pump 127. That is, the electric hydraulic excavator 100 of the present embodiment is a motor-driven hydraulic excavator that performs a traveling operation by the traveling body 101, a turning operation by the turning body 102, and an excavation operation by the work implement 110 by driving the hydraulic pump 105 by means of the electric motor 104. In addition, the electric motor 104 includes the motor rotation speed sensor 104a that detects the rotation speed Nm of the electric motor 104. The motor rotation speed sensor 104a is communicatively connected to the inverter 103, and outputs the rotation speed Nm of the electric motor 104 to the inverter 103.

As described above, the hydraulic pump 105 is driven by the electric motor 104, and provides hydraulic pressure to the actuator 120. The hydraulic pump 105 is a variable displacement pump that can change a delivery amount per rotation, for example. More specifically, the hydraulic pump 105 is a swash plate type variable displacement pump that can change a delivery amount per rotation by changing the tilt angle of a swash plate, for example. The hydraulic pump 105 is communicatively connected to the control device 130, for example, and controls the tilt angle of the swash plate on the basis of a tilt angle command θc received from the control device 130 to control a hydraulic pressure output. In this hydraulic pump 105, torque (absorption torque) for rotation changes according to the change in the tilt angle of this swash plate. The larger the delivery amount per rotation, the larger the absorption torque.

The actuator 120 operates by the hydraulic pressure generated by the hydraulic pump 105. The actuator 120 includes, for example, the traveling hydraulic motor 121 that drives the traveling body 101, and the turning hydraulic motor 122 that causes the turning body 102 to turn relative to the traveling body 101. In addition, the actuator 120 includes, for example, the boom cylinder 123 that vertically rotates the boom 111 of the work implement 110, the arm cylinder 124 that vertically rotates the arm 112 of the work implement 110, and the bucket cylinder 125 that vertically rotates the bucket 113 of the work implement 110.

In addition, the actuator 120 includes the control valve 126, for example. The control valve 126 distributes the hydraulic pressure generated by the hydraulic pump 105 to the traveling hydraulic motor 121, the turning hydraulic motor 122, the boom cylinder 123, the arm cylinder 124, and the bucket cylinder 125. Accordingly, the actuator 120 causes the traveling device 101, the turning body 102, and the work implement 110 to operate.

The control device 130 controls the electric power supplied to the electric motor 104 via the inverter 103. As illustrated in FIG. 2, for example, the control device 130 is communicatively connected to the inverter 103, the hydraulic pump 105, the power receiving device 106, the converter 107, the power storage device 140, and the HMI 150. As illustrated in FIG. 3, for example, the control device 130 includes a pump rotation speed computing section 131, a charge command calculating section 132, a motor command calculating section 133, and a pump control section 134.

The control device 130 includes one or more microcontrollers, for example. Each section of the control device 130 illustrated in FIG. 3 represents each function of the control device 130 implemented through execution of the program stored in the memory by means of the CPU of the microcontroller in the control device 130, for example. The operation of each section of the control device 130 will be described later.

As illustrated in FIG. 1 and FIG. 2, for example, the power receiving device 106 is connected to the commercial power source CP via a power supply cable SC. The power receiving device 106 has functions of, for example, detecting AC power supplied from the commercial power source CP and checking the normality of the voltage of the commercial power source CP. When a voltage anomaly of the AC power supplied from the commercial power source CP is detected, the power receiving device 106 interrupts an electric power supply path and protects the converter 107.

Each function of the above-described power receiving device 106 is implemented by a switching circuit, a voltage sensor, a current sensor, and a control circuit of the power receiving device 106, for example. The power receiving device 106 is communicatively connected to the control device 130 and outputs a power supply state PSS of the commercial power source CP including a normal or abnormal state of the voltage of AC power to the control device 130, for example.

The converter 107 converts the AC power supplied from the power receiving device 106 into DC power, and supplies the DC power to the inverter 103 or the power storage device 140. The converter 107 includes a converter circuit and a microcontroller, for example. The microcontroller of the converter 107 is communicatively connected to the control device 130. The microcontroller of the converter 107 controls the converter circuit on the basis of a charge command BCC received from the control device 130.

The converter circuit has a current control charge function of charging the power storage device 140 while controlling the current and a voltage control charge function of charging the power storage device 140 while controlling the voltage, for example. The microcontroller of the converter 107 monitors a state of the converter 107 and detects an anomaly of the converter 107, and outputs a converter state CNVS including a normal or abnormal state of the converter 107 to the control device 130, for example.

The power storage device 140 includes, for example, a battery pack 141, an interrupting device 142, a battery management unit (BMU) 143, and a master battery management unit (MBMU) 144. In the example illustrated in FIG. 3, the power storage device 140 includes a plurality of battery packs 141A, 141B, 141C. The battery packs 141A, 141B, 141C are provided with interrupting devices 142A, 142B, 142C, and BMUs 143A, 143B, 143C, respectively. Note that the numbers of battery packs 141, interrupting devices 142, and BMUs 143 in the power storage device 140 are not particularly limited.

The battery pack 141 includes, for example, a plurality of battery cells connected in series or in parallel, a voltage sensor that detects voltage in each battery cell, a temperature sensor that detects temperature of one or more battery cells, and a current sensor that detects current flowing in the battery cell. The battery cell may include, but is not limited to, a secondary battery such as a lithium ion secondary battery, for example. The interrupting device 142 is controlled by the BMU 143, and interrupts or connects the electric power supply path between the converter 107 and the battery pack 141.

The BMU 143 is communicatively connected to the battery pack 141, the interrupting device 142, and the MBMU 144, for example. The BMU 143, for example, acquires detection results of the voltage sensor, the temperature sensor, and the current sensor in the battery pack 141, and monitors the state of the battery pack 141. In addition, the BMU 143 computes and records a charge state of the battery pack 141 using the detection result of the voltage sensor in the battery pack 141 and a current integrated value based on the detection result of the current sensor.

In addition, the BMUs 143A, 143B, 143C respectively compute suppliable electric powers BPa, BPb, BPc of the battery packs 141A, 141B, 141C on the basis of the performance specification and the charge state of the battery cells of the battery packs 141A, 141B, 141C, and the detection result of the temperature sensor. In addition, when the battery pack 141 is not used or any anomaly of the battery pack 141 is detected, the BMU 143 controls the interrupting device 142 and interrupts the electric power supply path of the battery pack 141 by means of the interrupting device 142.

When the electric power supply paths of the battery packs 141A, 141B, 141C are respectively interrupted by the interrupting devices 142A, 142B, 142C, for example, the BMUs 143A, 143B, 143C respectively set the suppliable electric powers BPa, BPb, BPc of the battery packs 141A, 141B, 141C to zero. In addition, when the detection result of the temperature sensor in each of the battery packs 141A, 141B, 141C exceeds a predetermined temperature, for example, the BMUs 143A, 143B, 143C respectively limit the suppliable electric powers BPa, BPb, BPc of the battery packs 141A, 141B, 141C to a predetermined electric power that is lower than a usual electric power.

The MBMU 144 is communicatively connected to the control device 130 and to each of the BMUs 143A, 143B, 143C, for example. The MBMU 144 communicates with each of the BMUs 143A, 143B, 143C, and performs monitoring over the power storage device 140. The MBMU 144, for example, computes a battery suppliable electric power BPmax that is a sum of the suppliable electric powers BPa, BPb, BPc of the battery packs 141A, 141B, 141C received from the BMUs 143A, 143B, 143C, respectively, and outputs the battery suppliable electric power BPmax to the control device 130.

The HMI 150 includes a display device 151, an input device 152, and an operating device 153, for example. The display device 151 includes a liquid crystal display device, an organic EL display device, and the like, and is disposed inside of a cab 102a of the turning body 102 where an operator of the electric hydraulic excavator 100 gets on, for example. The display device 151 displays various kinds of information about the electric hydraulic excavator 100.

The input device 152 includes a touch panel provided integrally with the display device 151, for example. The input device 152 receives an input of information or a command by the operator and outputs the input to the control device 130, for example. The input of the information by the operator received at the input device 152 includes a suppliable electric power CPS of the commercial power source CP, for example. More specifically, since the commercial power source CP is prepared by the user of the electric hydraulic excavator 100, the suppliable electric power CPS of the commercial power source CP varies depending on the user. Thus, the display device 151, for example, displays the plurality of suppliable electric powers CPS as options on the screen, and the input device 152 receives a specified suppliable electric power CPS selected by the operator from the displayed options, and outputs the selected suppliable electric power CPS to the control device 130.

The operating device 153 is disposed inside of the cab 102a and includes a control dial for the operator to control the rotation speed of the hydraulic pump 105, for example. The operating device 153 is communicatively connected to the control device 130, and detects an operation amount DOA of the control dial by the operator and outputs the operation amount DOA to the control device 130.

Note that the operating device 153 may be configured to compute a target rotation speed of the hydraulic pump 105 in accordance with the operation amount of an operating lever (not illustrated) that manipulates each actuator 120, including the traveling hydraulic motor 121 that drives the traveling body 101, the turning hydraulic motor 122, the boom cylinder 123, the arm cylinder 124, and the bucket cylinder 125.

Figure 4:
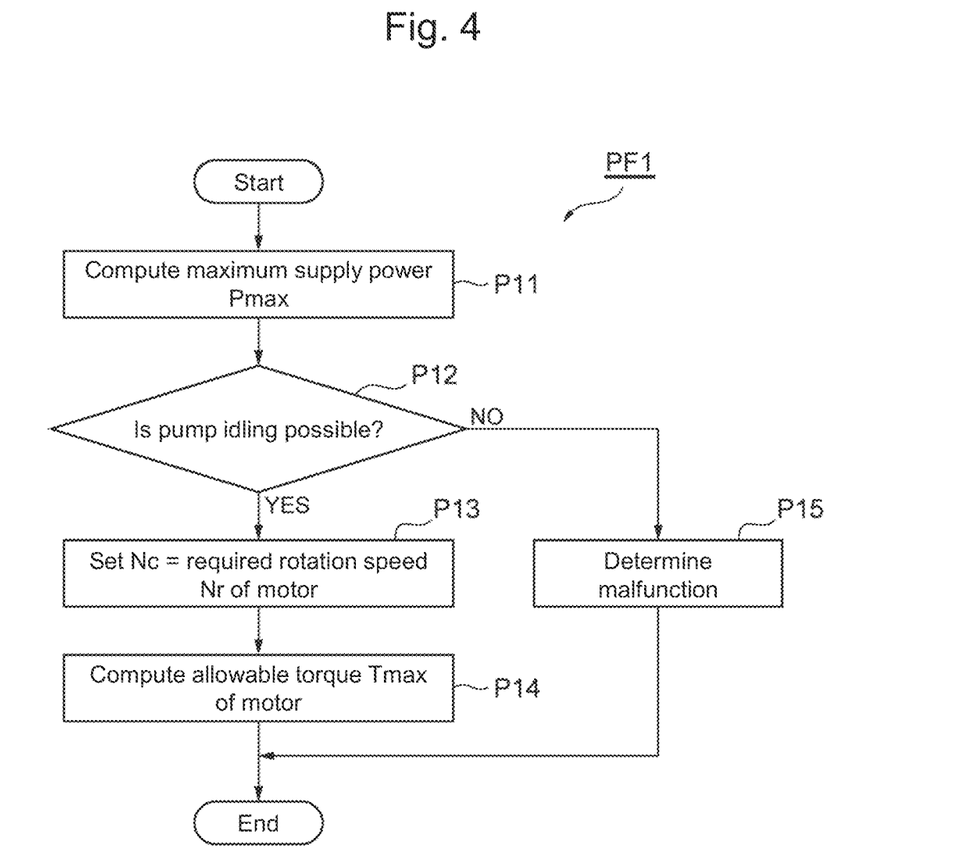
FIG. 4 is a flowchart illustrating the operation of a control device of the electric work machine of FIG. 3.
Figure 5:
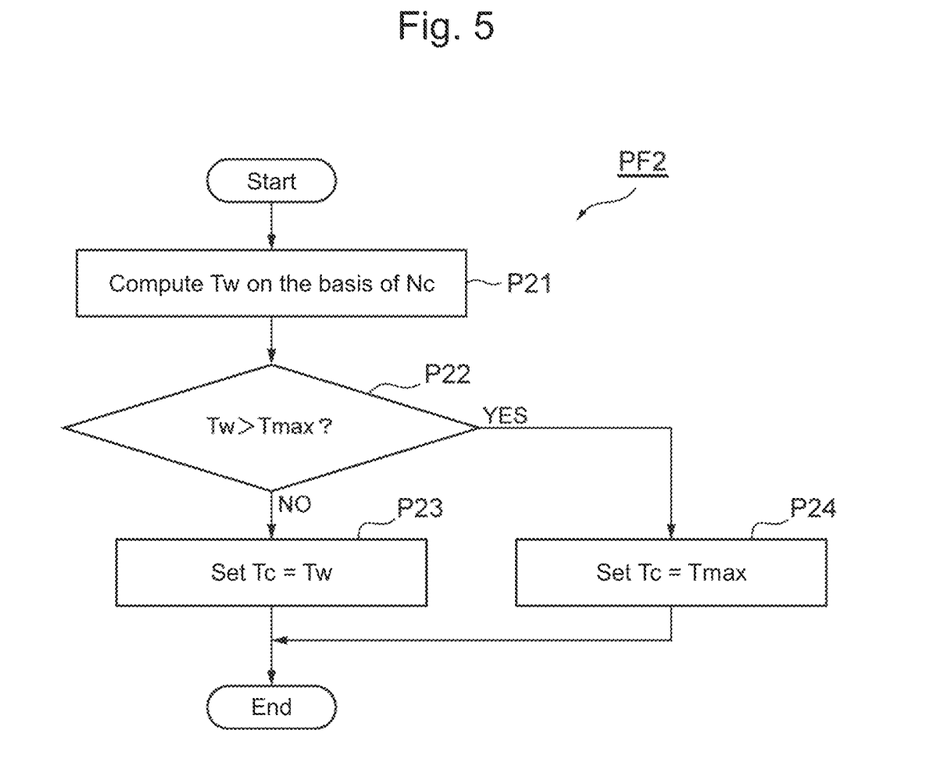
FIG. 5 is a flowchart illustrating the operation of an inverter of the electric work machine of FIG. 3.

Hereinafter, referring to FIG. 4 and FIG. 5, the operations of the control device 130 and the inverter 103 in the electric hydraulic excavator 100 of the present embodiment will be described. FIG. 4 is a flowchart illustrating an example of the process flow by the control device 130 of the electric hydraulic excavator 100. FIG. 5 is a flowchart illustrating an example of the process flow by the inverter 103 of the electric hydraulic excavator 100.

When process flow PF1 illustrated in FIG. 4 starts, the control device 130 first executes process P11 to compute a maximum supply power Pmax. In this process P11, the charge command calculating section 132 of the control device 130 illustrated in FIG. 3, for example, acquires the power supply state PSS of the commercial power source CP, the converter state CNVS, and the suppliable electric power CPS of the commercial power source CP from the power receiving device 106, the converter 107, and the input device 152, respectively. Further, the charge command calculating section 132 computes a suppliable electric power CPmax of the converter 107 on the basis of the acquired information.

More specifically, when the power supply state PSS of the commercial power source CP is normal, the charge command calculating section 132 substitutes the suppliable electric power CPS of the commercial power source CP selected by the user into the suppliable electric power CPmax of the converter 107. Meanwhile, when the power supply state PSS of the commercial power source CP is abnormal, the commercial power source CP is not connected to the power receiving device 106, or the converter state CNVS is abnormal, the charge command calculating section 132 substitutes zero into the suppliable electric power CPmax of the converter 107.

The charge command calculating section 132 outputs the computed suppliable electric power CPmax of the converter 107 to the motor command calculating section 133. In addition, the charge command calculating section 132 outputs, to the converter 107, a charge command BCC into which the computed suppliable electric power CPmax of the converter 107 has been substituted. The converter 107 controls the converter circuit such that the electric power supplied to the power storage device 140 is equal to the electric power corresponding to the charge command BCC received from the charge command calculating section 132.

In this process P11, the motor command calculating section 133 acquires the suppliable electric power CPmax of the converter 107 received from the charge command calculating section 132 and the battery suppliable electric power BPmax received from the MBMU 144. Further, the motor command calculating section 133 adds the acquired suppliable electric power CPmax of the converter 107 and battery suppliable electric power BPmax, and computes the maximum supply power Pmax of the plurality of power sources connected to the inverter 103.

Next, the control device 130 executes process P12 to determine whether the hydraulic pump 105 can idle at the minimum rotation speed by the maximum supply power Pmax of the plurality of power sources. The memory of the control device 130, for example, has recorded therein in advance an idling power IRP of the hydraulic pump 105 and an efficiency value EIM of the electric motor 104 and the inverter 103. The idling power IRP is a power required to cause the hydraulic pump 105 to idle at the minimum rotation speed.

Herein, the idling power IRP of the hydraulic pump 105 is computed, for example, by multiplying a minimum idling rotation speed Ni of the hydraulic pump 105 set in advance by a minimum absorption torque Tmin of the hydraulic pump 105 (IRP=Ni×Tmin). Note that in the swash plate type hydraulic pump 105, the minimum absorption torque Tmin of the hydraulic pump 105 is torque required to rotate the hydraulic pump 105 when the tilt angle of the swash plate is set to a minimum, and is determined according to the performance specification of the hydraulic pump 105. In addition, the efficiency value EIM of the electric motor 104 and the inverter 103 is determined according to the performance specification of the electric motor 104 and the inverter 103.

In this process P12, the motor command calculating section 133 of the control device 130, for example, compares the power of the electric motor 104 obtained by multiplying the maximum supply power Pmax of the plurality of power sources by the efficiency value EIM (Pmax×EIM) with the idling power IRP of the hydraulic pump 105. If the calculated power of the electric motor 104 is smaller than the idling power IRP (Pmax×EIM<IRP), the motor command calculating section 133 determines that the hydraulic pump 105 cannot idle at the minimum rotation speed (NO). In this case, the electric motor 104 is lacking in electric power for causing the hydraulic pump 105 to operate, and thus the control device 130 executes process P15 to determine a malfunction and ends the process flow PF1 illustrated in FIG. 4.

Meanwhile, if the calculated power of the electric motor 104 is equal to or larger than the idling power IRP (Pmax×EIM≥IRP) in the process P12, the motor command calculating section 133 determines that the hydraulic pump 105 can idle at the minimum rotation speed (YES), and executes process P13 in which a required rotation speed Nr of the electric motor 104 is substituted into the rotation speed command Nc for the electric motor 104.

The required rotation speed Nr of the electric motor 104 used in this process P13 is computed by the pump rotation speed computing section 131 of the control device 130, for example. More specifically, when the operator manipulates the control dial of the operating device 153 to control the rotation speed of the hydraulic pump 105, the operation amount DOA is input from the operating device 153 to the pump rotation speed computing section 131. The pump rotation speed computing section 131 computes the required rotation speed Nr of the electric motor 104 on the basis of the operation amount DOA received from the operating device 153, and outputs the required rotation speed Nr to the motor command calculating section 133.

In the process P13, the motor command calculating section 133 substitutes the required rotation speed Nr of the electric motor 104 received from the pump rotation speed computing section 131 into the rotation speed command Nc for the electric motor 104. That is, in the present embodiment, the control device 130 sets the rotation speed command Nc for the electric motor 104 on the basis of the required rotation speed Nr of the electric motor 104. Next, the control device 130 executes process P14 to compute an allowable torque Tmax of the electric motor 104.

In the process P14, the motor command calculating section 133 computes a torque Ta that can be output by the electric motor 104 when the hydraulic pump 105 is rotated at the rotation speed corresponding to the rotation speed command Nc, and substitutes the torque Ta into the allowable torque Tmax of the electric motor 104. Herein, the torque Ta that can be output by the electric motor 104 is a value obtained by dividing by the rotation speed command Nc for the electric motor 104, the value obtained by multiplying the maximum supply power Pmax of the plurality of power sources by the efficiency value EIM of the electric motor 104 and the inverter 103 (Ta=Pmax×EIM/Nc).

That is, in the present embodiment, the control device 130 computes the allowable torque Tmax of the electric motor 104 on the basis of the maximum supply power Pmax of the plurality of power sources. More specifically, the control device 130, for example, sets the allowable torque Tmax of the electric motor 104 to the torque Ta computed by dividing by the rotation speed command Nc for the electric motor 104, the value obtained by multiplying the maximum supply power Pmax of the plurality of power sources by the efficiency value EIM. As described above, this torque Ta is torque that can be output by the electric motor 104 when the maximum supply power Pmax is supplied from the plurality of power sources, and the electric motor 104 rotates the hydraulic pump 105 at the rotation speed corresponding to the rotation speed command Nc.

Through the above-described process P11 to process P14, the control device 130 of the present embodiment sets or computes the rotation speed command Nc and the allowable torque Tmax of the electric motor 104 on the basis of the required rotation speed Nr of the electric motor 104 and the maximum supply power Pmax of the plurality of power sources. After that, the control device 130 ends the process flow PF1 illustrated in FIG. 4, and outputs the rotation speed command Nc and the allowable torque Tmax of the electric motor 104 computed in the process P13 and process P14 to the inverter 103.

The rotation speed command Nc and the allowable torque Tmax of the electric motor 104 output from the control device 130 are input to the motor control section 103a of the inverter 103. The motor control section 103a outputs the rotation speed Nm received from the motor rotation speed sensor 104a of the electric motor 104 to the motor command calculating section 133 of the control device 130. In addition, the motor control section 103a controls the rotation speed of the electric motor 104 on the basis of the rotation speed command Nc and the allowable torque Tmax of the electric motor 104 received from the control device 130.

FIG. 5 is a flowchart illustrating the operation of the inverter 103 of the electric hydraulic excavator 100 of FIG. 3. When process flow PF2 illustrated in FIG. 5 starts, the inverter 103 executes process P21 in which a calculated torque Tw is computed on the basis of the rotation speed command Nc for the electric motor 104. In this process P21, the motor control section 103a of the inverter 103, for example, computes a calculated torque Tw of the electric motor 104 by multiplying by a gain Gp, a difference between the rotation speed command Nc for the electric motor 104 and the rotation speed Nm of the electric motor 104 detected by the motor rotation speed sensor 104a (Tw=Gp (Nc−Nm)). Herein, the gain Gp is a feedback gain for controlling the electric motor 104, and is calculated at the time of design and is set in advance.

Next, the inverter 103 executes process P22 to determine whether the calculated torque Tw of the electric motor 104 exceeds the allowable torque Tmax. If the motor control section 103a determines, for example, that the calculated torque Tw of the electric motor 104 is not larger than the allowable torque Tmax (NO) in this process P22, the inverter 103 executes process P23 in which the torque command Tc for the electric motor 104 is set to the calculated torque Tw of the electric motor 104, and ends the process flow PF2 illustrated in FIG. 5.

Meanwhile, if the motor control section 103a determines, for example, that the calculated torque Tw of the electric motor 104 is larger than the allowable torque Tmax (YES) in the process P22, the inverter 103 executes process P24 in which the torque command Tc for the electric motor 104 is set to the allowable torque Tmax of the electric motor 104, and ends the process flow PF2 illustrated in FIG. 5. After that, the motor control section 103a outputs the torque command Tc for the electric motor 104 to the current control section 103b. The current control section 103b controls the IGBT of the inverter circuit of the inverter 103 such that the electric motor 104 outputs a torque corresponding to the torque command Tc.

As described above, the inverter 103 sets the allowable torque Tmax to the torque command Tc if the calculated torque Tw of the electric motor 104 computed by multiplying by the gain Gp, the difference between the rotation speed command Nc for the electric motor 104 and the rotation speed Nm of the electric motor 104, exceeds the allowable torque Tmax. Meanwhile, the inverter 103 sets the calculated torque Tw to the torque command if the calculated torque Tw does not exceed the allowable torque Tmax. Then, the inverter 103 supplies the electric power that can generate a torque corresponding to the torque command Tc to the electric motor 104.

In addition, the allowable torque Tmax of the electric motor 104 computed by the motor command calculating section 133 of the control device 130 is input also to the pump control section 134. The pump control section 134 computes a tilt angle θ of the swash plate in the variable displacement type hydraulic pump 105 on the basis of the received allowable torque Tmax.

More specifically, the memory of the control device 130 has recorded therein a tilt angle/torque table in which the torque required to rotate the hydraulic pump 105 is defined for each tilt angle θ of the swash plate of the hydraulic pump 105. The pump control section 134 references the tilt angle/torque table recorded in the memory of the control device 130, and derives the tilt angle θ of the hydraulic pump 105 at which the torque required to rotate the hydraulic pump 105 does not exceed the allowable torque Tmax of the electric motor 104. The pump control section 134 outputs the derived tilt angle θ as a tilt angle command θc to the hydraulic pump 105 and controls the tilt angle θ of the swash plate of the hydraulic pump 105.

Hereinafter, operational functions of the electric hydraulic excavator 100 of the present embodiment will be described.

As described above, the electric hydraulic excavator 100 of the present embodiment includes the inverter 103 connected to the commercial power source CP and the power storage device 140 serving as a plurality of power sources, each having a suppliable electric power that changes, and the electric motor 104 driven by the electric power supplied from the plurality of power sources via the inverter 103. In addition, the electric hydraulic excavator 100 includes the hydraulic pump 105 driven by the electric motor 104, the actuator 120 that operates by the hydraulic pressure generated by the hydraulic pump 105, and the control device 130 that controls the electric power supplied to the electric motor 104 via the inverter 103. The control device 130 sets or computes the rotation speed command Nc and the allowable torque Tmax of the electric motor 104 on the basis of the required rotation speed Nr of the electric motor 104 and the maximum supply power Pmax of the plurality of power sources. The inverter 103 computes the calculated torque Tw of the electric motor 104 by multiplying by the gain Gp, the difference between the rotation speed command Nc for the electric motor 104 and the rotation speed Nm of the electric motor 104. The inverter 103 sets the allowable torque Tmax to the torque command Tc if the calculated torque Tw as computed exceeds the allowable torque Tmax and sets the calculated torque Tw to the torque command Tc if the calculated torque Tw does not exceed the allowable torque Tmax. Then, the inverter 103 supplies the electric power that can generate a torque corresponding to the torque command Tc to the electric motor 104.

According to the electric hydraulic excavator 100 of the present embodiment with such a configuration, the rotation speed of the electric motor 104 and the hydraulic pump 105 is controlled by the required rotation speed Nr of the electric motor 104 based on the manipulation of the operating device 153 by the operator, for example. At that time, the rotation speed of the electric motor 104 and the hydraulic pump 105 can be controlled with the inverter 103 limiting the electric power not to be consumed beyond the maximum supply power Pmax of the plurality of power sources.

For example, the electric hydraulic excavator 100 of the present embodiment further includes the power storage device 140 connected to the inverter 103, and the plurality of power sources includes the power storage device 140. When a malfunction occurs in one battery pack 141A of the plurality of battery packs 141A, 141B, 141C of the power storage device 140, the BMU 143A interrupts the electric power supply path of the battery pack 141A by means of the interrupting device 142A. Accordingly, the suppliable electric power BPa of the battery pack 141A becomes zero and the battery suppliable electric power BPmax decreases, and the maximum supply power Pmax of the plurality of power sources decreases.

However, as described above, the control device 130 sets or computes the rotation speed command Nc and the allowable torque Tmax of the electric motor 104 on the basis of the required rotation speed Nr of the electric motor 104 and the maximum supply power Pmax of the plurality of power sources. This can reduce the rotation speed command Nc and the allowable torque Tmax of the electric motor 104 in accordance with the decrease in the battery suppliable electric power BPmax of the power storage device 140. The inverter 103 sets the allowable torque Tmax to the torque command Tc if the calculated torque Tw based on the rotation speed command Nc for the electric motor 104 exceeds the allowable torque Tmax and sets the calculated torque Tw to the torque command if the calculated torque Tw does not exceed the allowable torque Tmax. Then, the inverter 103 supplies the electric power that can generate a torque corresponding to the torque command Tc to the electric motor 104. As a result, even when any malfunction in the power storage device 140 causes a decrease in the battery suppliable electric power BPmax and the maximum supply power Pmax of the plurality of power sources decreases, it is possible to rotate the hydraulic pump 105 with a torque that can be output by the electric motor 104, and to avoid stalling of the electric motor 104.

In addition, in the electric hydraulic excavator 100 of the present embodiment, the hydraulic pump 105 is a variable displacement pump. The control device 130 sets the required rotation speed Nr of the electric motor 104 based on the operation amount DOA of the operating device 153 to the rotation speed command Nc. In addition, the control device 130 sets the allowable torque Tmax of the electric motor 104 to the torque Ta computed by dividing by the rotation speed command Nc, the value obtained by multiplying the maximum supply power Pmax by the efficiency value EIM.

According to the electric hydraulic excavator 100 of the present embodiment with such a configuration, it is possible to increase or decrease the allowable torque Tmax of the electric motor 104 set by the control device 130 in accordance with an increase or decrease in the maximum supply power Pmax of the plurality of power sources. As a result, the control device 130 can output the tilt angle command θc corresponding to the allowable torque Tmax of the electric motor 104 to the hydraulic pump 105 and control the tilt angle θ of the hydraulic pump 105, and can reduce the load of the electric motor 104 and avoid stalling of the electric motor 104.

In addition, in the electric hydraulic excavator 100 of the present embodiment, the plurality of power sources includes the commercial power source CP. Thus, as described above, for example, the suppliable electric power CPmax of the converter 107 may change and the maximum supply power Pmax of the plurality of power sources may change depending on the specification of the commercial power source CP, the connection or disconnection of the power supply cable SC, or the anomaly of the converter 107, and the like. Even in such a case, the control device 130 adds the suppliable electric power CPmax of the converter 107 and the battery suppliable electric power BPmax, and computes the maximum supply power Pmax of the plurality of power sources. As a result, even when the suppliable electric power CPmax of the converter 107 decreases and the maximum supply power Pmax of the plurality of power sources decreases, it is possible to rotate the hydraulic pump 105 with a load that can be output by the electric motor 104 and to avoid stalling of the electric motor 104 in the same manner as the case where the battery suppliable electric power BPmax decreases.

As described above, according to the present embodiment, it is possible to provide the electric hydraulic excavator 100 that can avoid stalling of the electric motor 104 that drives the hydraulic pump 105 and avoid unintentional stopping of the actuator 120 that operates by hydraulic pressure generated by the hydraulic pump 105, even if the suppliable electric power of each of the power sources changes and the maximum supply power Pmax from the plurality of power sources changes.

Second Embodiment

Figure 6:
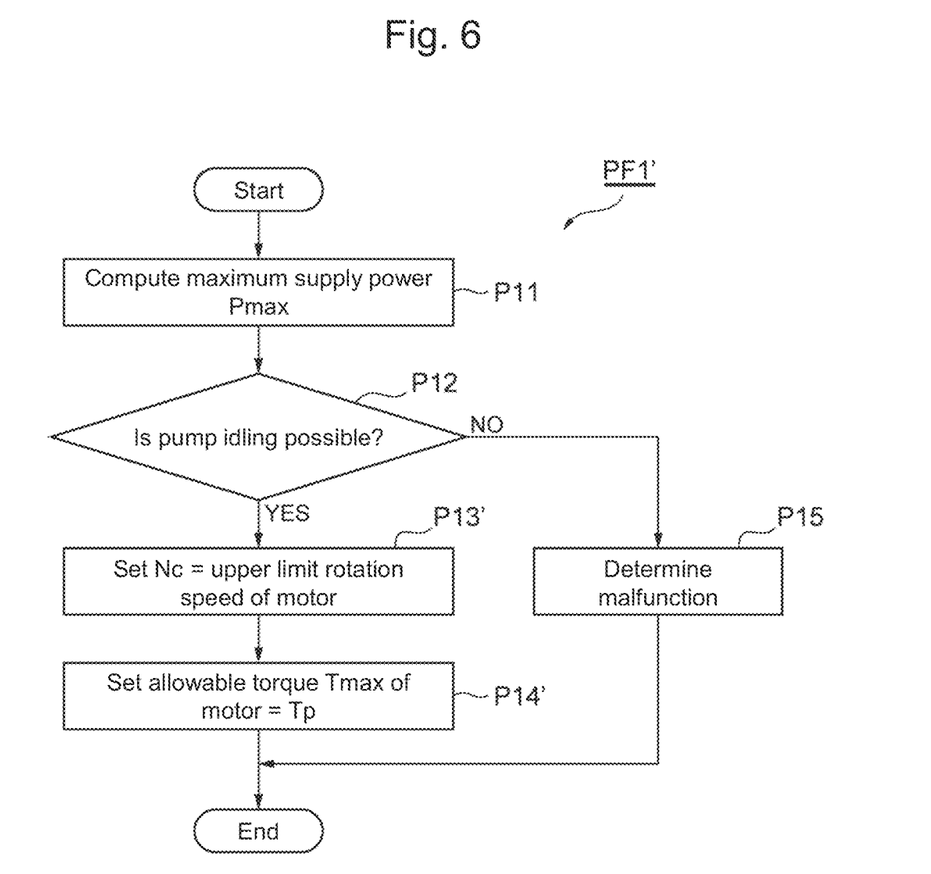
FIG. 6 is a flowchart corresponding to FIG. 4, in a second embodiment of the electric work machine according to the present disclosure.

Hereinafter, referring to FIG. 6 in conjunction with FIG. 1 to FIG. 3 and FIG. 5 of the foregoing first embodiment, a second embodiment of the electric hydraulic excavator according to the present invention will be described. FIG. 6 is a flowchart corresponding to FIG. 4, in the second embodiment of the electric hydraulic excavator according to the present disclosure.

The electric hydraulic excavator 100 of the present embodiment is different from the electric hydraulic excavator 100 of the foregoing first embodiment in the hydraulic pump 105 being a fixed-displacement pump and processes P13', P14' in which the control device 130 computes or sets the rotation speed command Nc and the allowable torque Tmax of the electric motor 104. The other features of the electric hydraulic excavator 100 of the present embodiment are the same as those of the electric hydraulic excavator 100 of the first embodiment, and thus the same reference numeral is assigned to the same element, and description thereof will be omitted.

In the present embodiment, when process flow PF1' illustrated in FIG. 6 starts, the control device 130 executes the process P11 to compute the maximum supply power Pmax of the plurality of power sources as in the foregoing first embodiment. After that, the control device 130 executes the process P12 to determine whether the hydraulic pump 105 can idle at the minimum rotation speed by the maximum supply power Pmax of the plurality of power sources as in the foregoing first embodiment.

In the process P12, if it is determined that the hydraulic pump 105 can idle at the minimum rotation speed (YES), the control device 130 executes process P13' in which an upper limit rotation speed of the electric motor 104 is substituted into the rotation speed command Nc. In the present embodiment, the memory of the control device 130 has recorded therein in advance a drive torque Tp required to drive the hydraulic pump 105 that is a fixed-displacement pump, for example.

In the process P13', the motor command calculating section 133, for example, acquires the battery suppliable electric power BPmax received from the MBMU 144 of the power storage device 140 and the suppliable electric power CPmax of the converter 107 received from the charge command calculating section 132. Further, the motor command calculating section 133 adds the battery suppliable electric power BPmax and the suppliable electric power CPmax of the converter 107, and computes the maximum supply power Pmax of the plurality of power sources.

Further, in the process P13', the motor command calculating section 133 multiplies the maximum supply power Pmax of the plurality of power sources by the efficiency value EIM and divides the result by the drive torque Tp of the hydraulic pump 105 recorded in the memory, thereby computing an upper limit rotation speed Nmax of the electric motor 104 (Nmax=Pmax×EIM/Tp). Then, the motor command calculating section 133 sets the computed upper limit rotation speed Nmax to the rotation speed command Nc for the electric motor 104.

After that, the control device 130 executes process P14' in which the allowable torque Tmax of the electric motor 104 is set to the drive torque Tp required to drive the hydraulic pump 105 that is a fixed-displacement pump. In the present embodiment, since the hydraulic pump 105 is the fixed-displacement pump, the drive torque Tp required to rotate the hydraulic pump 105 does not change. Therefore, the motor command calculating section 133, for example, substitutes the drive torque Tp of the hydraulic pump 105 into the allowable torque Tmax of the electric motor 104, and ends the process flow PF1' illustrated in FIG. 6.

As described above, in the electric hydraulic excavator 100 of the present embodiment, the hydraulic pump 105 is the fixed-displacement pump. In addition, the control device 130 computes the rotation speed command Nc for the electric motor 104 by dividing by the drive torque Tp required to drive the hydraulic pump 105, the value obtained by multiplying the maximum supply power Pmax of the plurality of power sources by the efficiency value EIM, and sets the drive torque Tp of the hydraulic pump 105 to the allowable torque Tmax of the electric motor 104.

According to the electric hydraulic excavator 100 of the present embodiment with such a configuration, even if the maximum supply power Pmax of the plurality of power sources changes, it is possible to limit the upper limit rotation speed Nmax of the electric motor 104 in accordance with the maximum supply power Pmax. Therefore, even if the maximum supply power Pmax of the plurality of power sources changes, it is possible to generate the drive torque Tp that the electric motor 104 can drive the hydraulic pump 105, and can avoid stalling of the electric motor 104.

Third Embodiment

Figure 7:
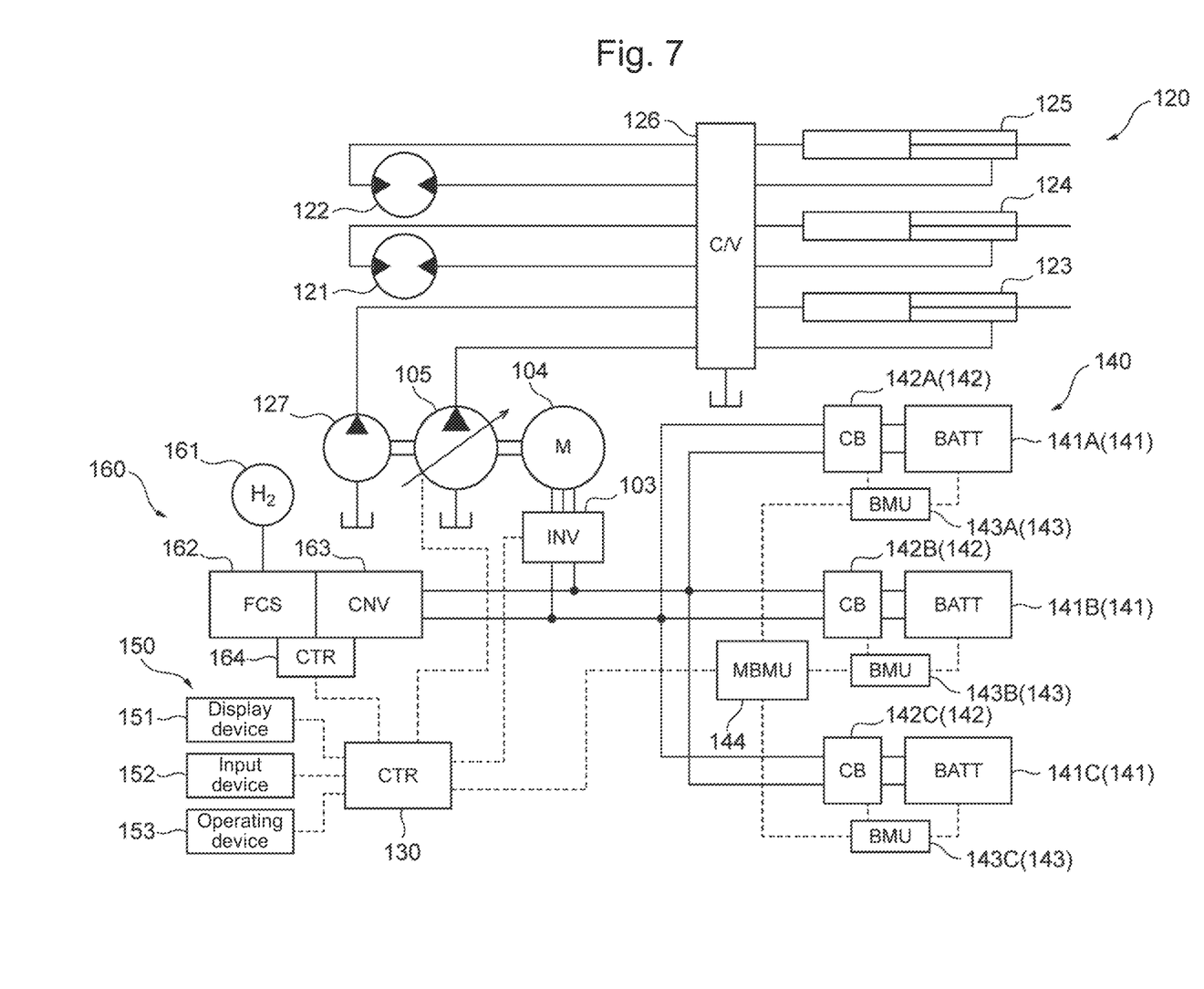
FIG. 7 is a block diagram corresponding to FIG. 2, in a third embodiment of the electric work machine according to the present disclosure.
Figure 8:
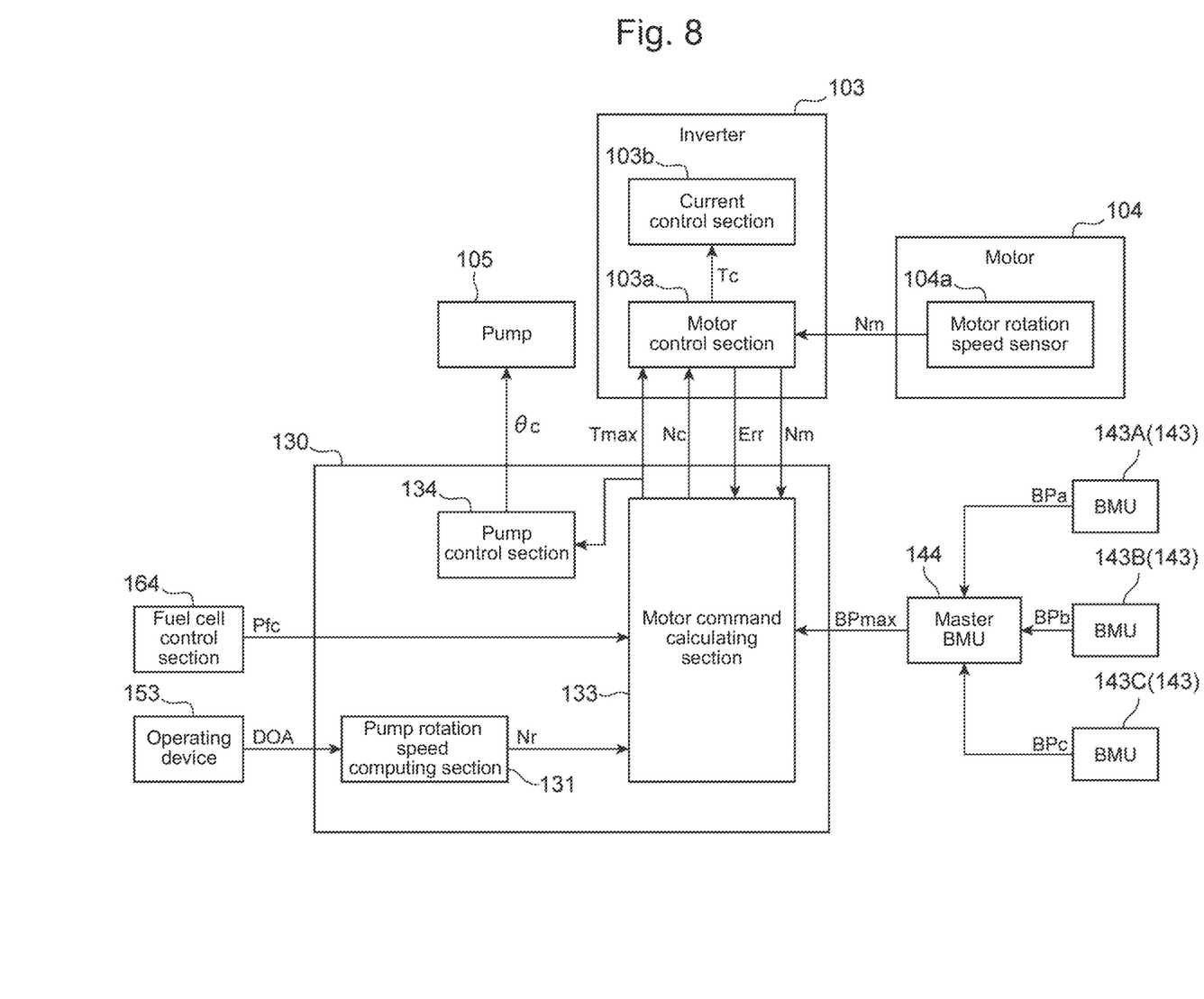
FIG. 8 is a block diagram corresponding to FIG. 3, in the third embodiment of the electric work machine according to the present disclosure.

Hereinafter, referring to FIG. 7 and FIG. 8 in conjunction with FIG. 1 of the foregoing first embodiment, a third embodiment of the electric hydraulic excavator according to the present invention will be described. FIG. 7 is a block diagram corresponding to FIG. 2, in the third embodiment of the electric hydraulic excavator according to the present invention. FIG. 8 is a block diagram corresponding to FIG. 3, in the third embodiment of the electric hydraulic excavator according to the present invention.

The electric hydraulic excavator 100 of the present embodiment includes a fuel cell system 160 connected to the inverter 103 instead of the power receiving device 106 and the converter 107 of the electric hydraulic excavator 100 of the first embodiment. That is, in the present embodiment, the plurality of power sources of the electric hydraulic excavator 100 includes the power storage device 140 and the fuel cell system 160, for example.

The fuel cell system 160 includes, for example, a hydrogen tank 161, a fuel cell stack 162, a fuel cell converter (FC converter) 163, and a fuel cell control section (FC control section) 164. The hydrogen tank 161 is mounted on the turning body 102 of the electric hydraulic excavator 100 and is filled with high-pressure hydrogen gas, for example. The fuel cell stack 162 includes a plurality of fuel cells mounted on the turning body 102 and generates electric power through reaction of the hydrogen gas supplied from the hydrogen tank 161 with oxidizing gas such as air, oxygen, or the like, for example.

The FC converter 163, for example, converts voltage of the electric power supplied from the fuel cell stack 162 and supplies the electric power to the inverter 103 and the power storage device 140. The FC control section 164, for example, is communicatively connected to the FC converter 163 and the control device 130 and monitors the state of FC converter 163 and controls the FC converter 163. In addition, the FC control section 164 computes a suppliable electric power Pfc of the fuel cell system 160 that can be supplied from the FC converter 163 to the inverter 103 and the power storage device 140, and outputs the suppliable electric power Pfc to the motor command calculating section 133 of the control device 130.

The suppliable electric power Pfc of the fuel cell system 160 is set on the basis of the specification of the fuel cell stack 162 and is recorded in advance in the memory of the control device 130, for example. In addition, the FC control section 164 sets the suppliable electric power Pfc of the fuel cell system 160 to be lower than a usual electric power when the remaining amount of hydrogen in the hydrogen tank 161 becomes lower than a predetermined level, or when any anomaly occurs in the fuel cell stack 162 or the FC converter 163.

The motor command calculating section 133 adds the suppliable electric power Pfc of the fuel cell system 160 received from the FC control section 164 and the battery suppliable electric power BPmax received from the MBMU 144 of the power storage device 140 and computes the maximum supply power Pmax of the plurality of power sources, for example.

According to the electric hydraulic excavator 100 of the present embodiment with such a configuration, as in the electric hydraulic excavator 100 of the foregoing first and second embodiments, it is possible to provide the electric hydraulic excavator 100 that can avoid stalling of the electric motor 104 that drives the hydraulic pump 105 and avoid unintentional stopping of the actuator 120 that operates by hydraulic pressure generated by the hydraulic pump 105, even if the maximum supply power Pmax of the plurality of power sources changes.

Although the embodiments of the electric hydraulic excavator according to the present disclosure have been described in detail above with reference to the drawings, specific configurations are not limited thereto, and any design changes that fall within the scope of the present disclosure are encompassed by the scope of the present disclosure. For example, in the foregoing embodiments, as the plurality of power sources, the combination of the commercial power source and the power storage device and the combination of the fuel cell system and the power storage device have been described. However, the combinations of the plurality of power sources are not particularly limited, and may be, for example, a combination of a commercial power source and a fuel cell system, a combination of a commercial power source, solar cells, and a power storage device, or a combination of a plurality of power storage devices. In addition, the number of battery packs of the power storage device may be one or more than one.

REFERENCE SIGNS LIST

100 Electric hydraulic excavator
103 Inverter
104 Electric motor
105 Hydraulic pump
120 Actuator
130 Control device
140 Power storage device (power source)
160 Fuel cell system (power source)
CP Commercial power source (power source)
EIM Efficiency value
Gp Gain
Nm Rotation speed
Nc Rotation speed command
Nr Required rotation speed
Pmax Maximum supply power
Tc Torque command
Tmax Allowable torque
Tp Drive torque
Tw Calculated torque

The invention claimed is:

1. An electric construction machine, comprising:
an inverter connected to a plurality of power sources, each having a suppliable electric power that changes; an electric motor driven by an electric power supplied from the plurality of power sources via the inverter; a hydraulic pump driven by the electric motor; an actuator that operates by hydraulic pressure generated by the hydraulic pump; a control device that that is configured to control the electric power supplied to the electric motor via the inverter, and a power storage device connected to the inverter,
wherein the plurality of power sources includes the power storage device, and a commercial power source or a fuel cell system,
wherein the control device is configured to set or compute a rotation speed command and an allowable torque of the electric motor on the basis of a required rotation speed of the electric motor or a drive torque of the hydraulic pump and a maximum supply power to which each suppliable electric power of the plurality of power sources has been added, and wherein the inverter is configured to set the allowable torque to a torque command if a calculated torque of the electric motor computed on the basis of the rotation speed command and a rotation speed of the electric motor exceeds the allowable torque, and to set the calculated torque to the torque command if the calculated torque does not exceed the allowable torque, and the inverter is configured to supply an electric power that generates a torque corresponding to the torque command to the electric motor.

2. The electric construction machine according to claim 1, wherein the hydraulic pump is a variable displacement pump, and wherein the control device is configured to set the required rotation speed of the electric motor to the rotation speed command, and to set the allowable torque of the electric motor to a torque computed by dividing by the rotation speed command, a value obtained by multiplying the maximum supply power by an efficiency value.

3. The electric construction machine according to claim 1, wherein the hydraulic pump is a fixed-displacement pump, and wherein the control device is configured to compute the rotation speed command for the electric motor by dividing by the drive torque required to drive the hydraulic pump, a value obtained by multiplying the maximum supply power by an efficiency value, and to set the drive torque of the hydraulic pump to the allowable torque of the electric motor.

* * * * *